M. S. TOWSON.
CONTROLLER.
APPLICATION FILED MAY 19, 1909.
997,520.
Patented July 11, 1911.
3 SHEETS—SHEET 2.
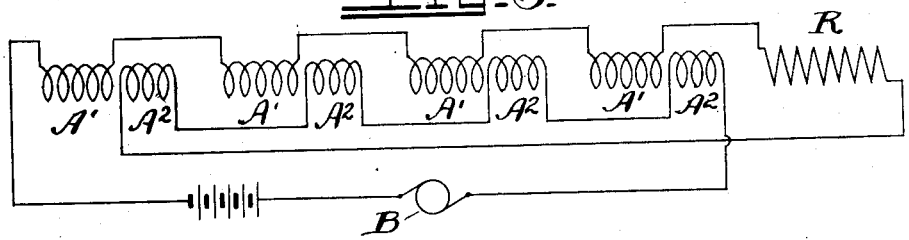
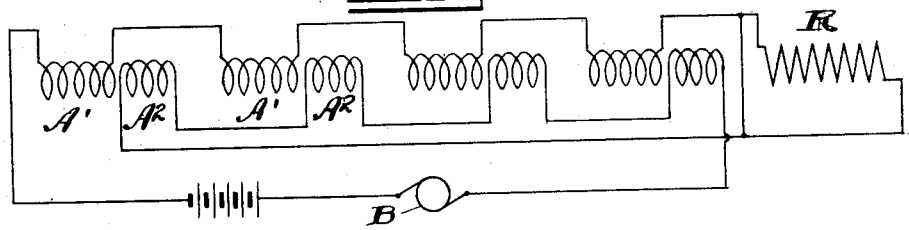
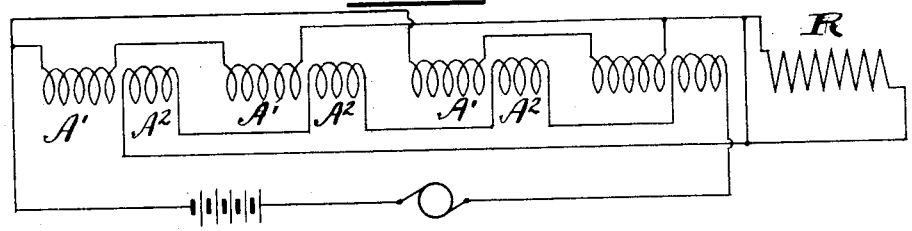
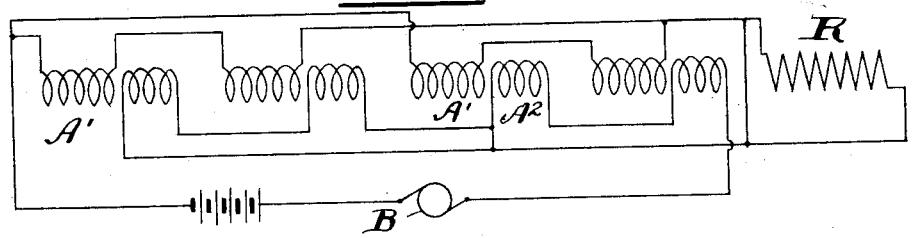
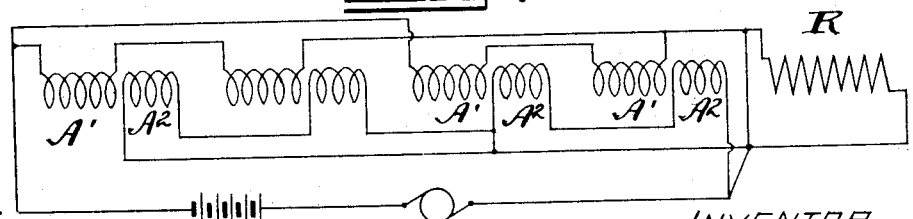
Witnesses
E. B. Gilchrist
H. R. Sullivan
Inventor
Morris S. Towson
by
Thurston Woodward

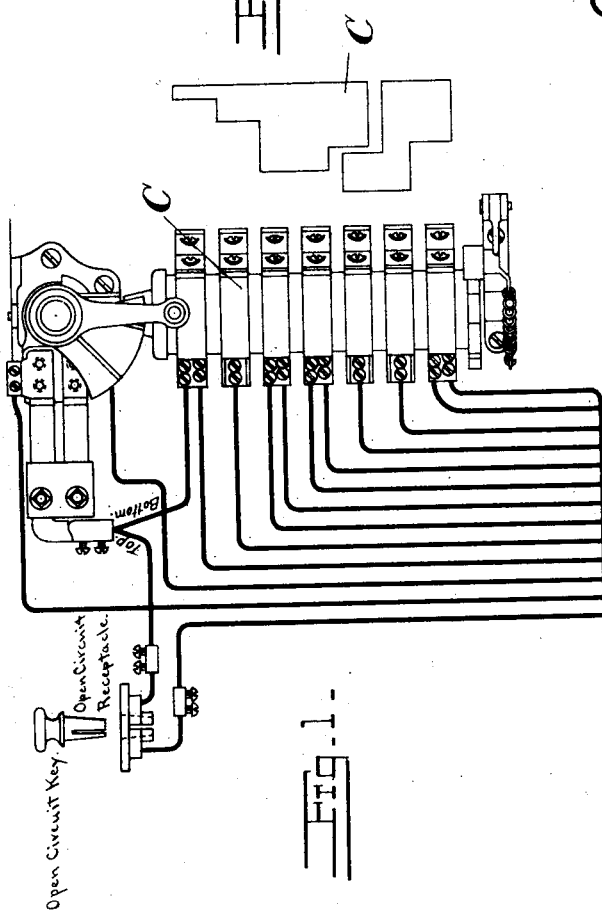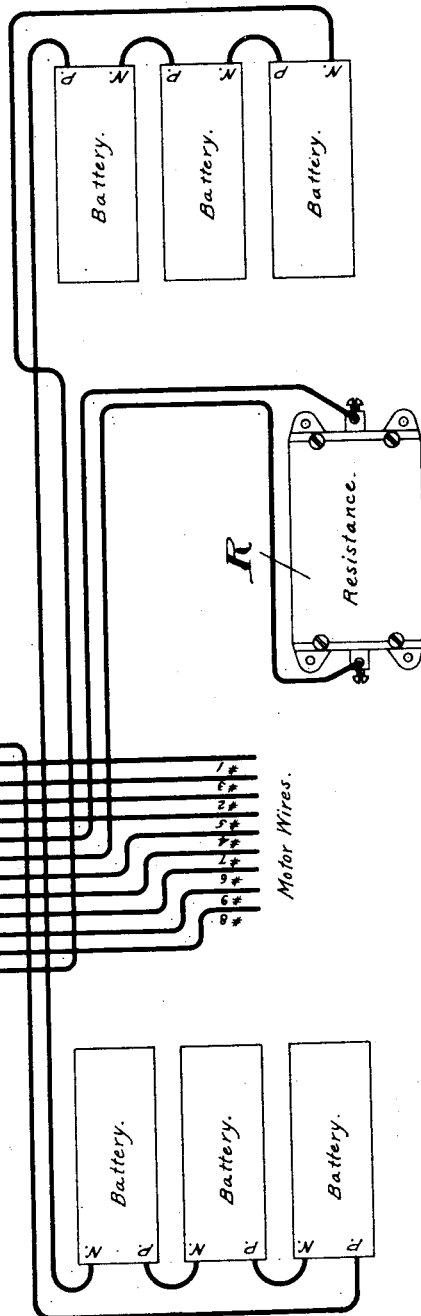

M. S. TOWSON.
CONTROLLER.
APPLICATION FILED MAY 19, 1909.

997,520.

Patented July 11, 1911.
3 SHEETS—SHEET 3.

Witnesses.
E. B. Gilchrist.
H. P. Sullivan.

Inventor.
Morris S. Towson
by Thurston & Kwis
Attys.

UNITED STATES PATENT OFFICE.

MORRIS S. TOWSON, OF CLEVELAND, OHIO.

CONTROLLER.

997,520.  Specification of Letters Patent.  Patented July 11, 1911.

Application filed May 19, 1909. Serial No. 496,900.

*To all whom it may concern:*

Be it known that I, MORRIS S. TOWSON, a citizen of the United States, residing at Cleveland, in the county of Cuyahoga and State of Ohio, have invented a certain new and useful Improvement in Controllers, of which the following is a full, clear, and exact description.

The present invention is directed to a system for controlling electric motors.

The object of the invention has been to provide a system wherein the torque is continuous and not interrupted in passing from one speed to another. The advantage of such a system in practical operation as, for example, in connection with road vehicles driven by batteries, will be obvious upon an exposition of its character.

Figure 8:
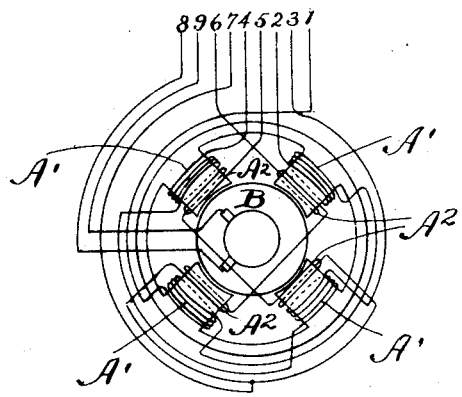
Figure 9:
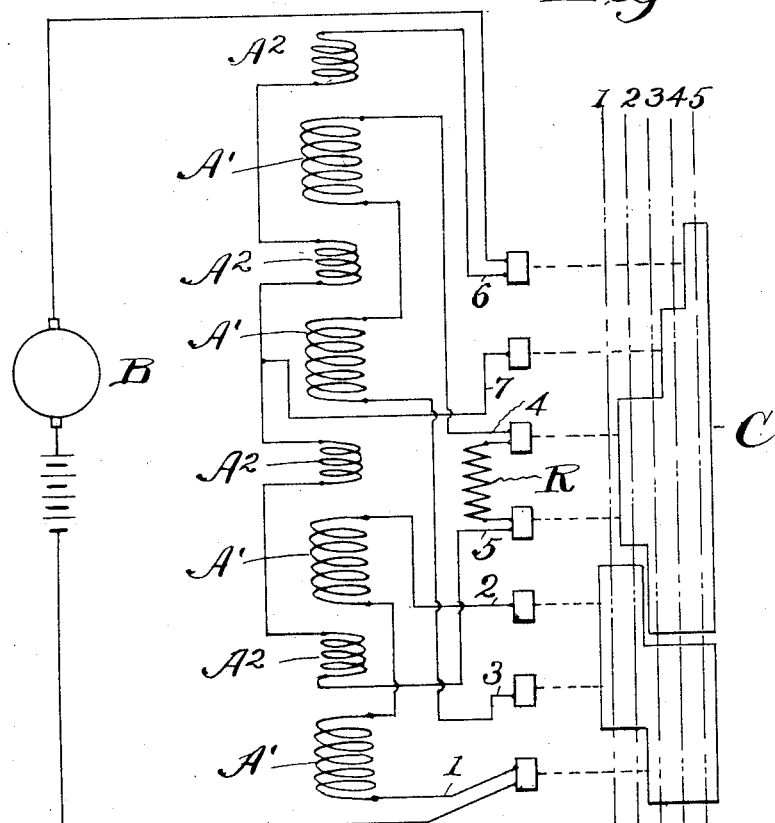

It will be seen that the above object is attained by that embodiment of my invention described in the following specification and illustrated in the accompanying drawings, in which:

Figure 1 is a diagrammatic representation of the connections between the batteries and the motor through the controller. Fig. 2 is a development of the particular controller drum illustrated in Fig. 1. Figs. 3, 4, 5, 6 and 7 are diagrammatic representations showing the changes made in the connections in passing through the various speeds. Fig. 8 is a conventional representation of the motor. Fig. 9 is a diagrammatic representation of the motor and controller with the various connections between the two.

The system which I have here illustrated is that used with a motor of which the field coils are series wound and sectional in their character. By sectional I mean that each pole is provided with a plurality of independent coils, and in the present illustration of the system I have shown two coils $A'$, $A^2$ upon each pole. The relative proportion between the two coils is not material for the purpose of attaining continuous torque, although I would suggest, as an effective arrangement for securing variations of speed in light vehicles, that one of the coils have two to three times as many turns as the other. The larger coils $A'$ I will hereafter call the main field coils and the smaller $A^2$ will be called the auxiliary coils, but it will be understood, of course, that this nomenclature is employed for convenience of understanding only.

The system is shown as including the usual batteries and resistance R. The particular construction of the armature B or the controller C employed is immaterial, it being merely necessary that they shall be mechanically suitable. I have shown a controller of the drum type, but any other type will do as well.

Referring to Figs. 3 to 7 inclusive, it will be seen that the system contemplates the establishing of connections at the first speed such that the current will flow through a resistance and through both sections of all of the field coils, thus giving the strongest field and the lowest possible speed to the armature. The next movement of the controller is, as shown in Fig. 4, designed to short circuit the resistance but to leave all of the field coils in series connection as before, thus giving the next higher speed. The next movement of the controller, see Fig. 5, is designed to break the connection through the main field coils and then establish them in series parallel, the auxiliary coils remaining without any change in their connections, there being shown in the present case two main coils in each series since the diagram refers to a four-pole machine. At this speed the resistance will remain out as before and the strength of the fields will be diminished by reason of the fact that the current will now be divided in passing through the main field coils, although the full current will continue through the auxiliary coils as before. From this arrangement a still higher speed will result. At the next movement of the controller, see Fig. 6, two of the auxiliary coils are short circuited, the other coils remaining in the field as before. At the final movement of the controller, see Fig. 7, the rest of the auxiliary coils are short circuited, the current flowing only through the parallel series of the main field coils, thus giving the highest speed of the system.

It will be noted that many variations in speed are obtained and that although a slight spark is had in making the necessary connections between the second and third speed, nevertheless there will be a continuous flow of current through the field and the motor throughout the entire range of possible change, and that I am thus enabled to obtain a continuous torque and a smooth and even action of the motor. It will further be noted that in attaining the higher speeds there is no waste of current such as occurs in those systems where the field is weakened by shunting part of the current and permitting that part to effect no work other than the heating of the resistant material through which it passes.

In Fig. 1 a number of motor wires, designated 1 to 9, are shown extending from the controller C; and in Fig. 8 continuations of these same wires are shown properly connected to the different groups of main and auxiliary field coil sections and to the commutator brushes,—the motor wires in Fig. 8 being arranged in the order and being designated the same as in Fig. 1.

In Fig. 9, wherein I have shown diagrammatically the motor, controller and batteries, the different parts of the motor and controller are connected by the motor wires shown in Figs. 1 and 8, and the five running positions of the controller are shown by dot and dash lines, numbered 1 to 5. It will be seen that when the controller is in the first running position the contact fingers to which motor wires 2 and 3 are connected, are bridged by reason of their engagement with a contact or segment of the controller drum, and that the arrangement and connections shown in Fig. 3 will be obtained, the battery current passing in series through the four main field coil sections $A'$, through the resistance R, through the four auxiliary field coil sections $A^2$, and through the armature B. It will be seen also from this figure that when the controller is in the second, third, fourth and fifth running positions the arrangements and connections shown in Figs. 4, 5, 6 and 7, respectively, will be obtained.

Having thus described my invention, I claim:

1. In combination in a motor control system, a motor having a plurality of sets of field coil sections, and a controller having means for changing the relation of the sections of one set with respect to one another, without changing the relation of the sections of the other set.

2. In a motor control system, in combination, a motor having a field winding comprising two sets of independent coil sections, and a controller having means for connecting all the coils of the different sets in series, and for changing the sections of one set from series to series parallel relation without changing the relation of the sections of the other set.

3. In a motor control system, a motor having two sets of field coil sections, and a controller having means for varying the relation of the sections of one set with respect to one another, and for varying the number of effective sections of the other set.

4. In a motor control system, a motor having a field winding comprising two sets of coil sections, and a controller having means for varying the relation of the sections of one set with respect to one another, and for short circuiting different numbers of the sections of the other set.

5. In a motor control system, a motor having a field winding consisting of two sets of independent coil sections, and a controller having means for connecting all the sections of two sets in series relation, for changing the sections of one set from series to series parallel relation, and for short circuiting different numbers of the sections of the other set.

In testimony whereof, I hereunto affix my signature in the presence of two witnesses.

MORRIS S. TOWSON.

Witnesses:
J. M. WOODWARD,
H. R. SULLIVAN.

---

Copies of this patent may be obtained for five cents each, by addressing the "Commissioner of Patents, Washington, D. C."